US006175723B1

(12) United States Patent
Rothwell, III

(10) Patent No.: US 6,175,723 B1
(45) Date of Patent: Jan. 16, 2001

(54) SELF-STRUCTURING ANTENNA SYSTEM WITH A SWITCHABLE ANTENNA ARRAY AND AN OPTIMIZING CONTROLLER

(75) Inventor: Edward Joseph Rothwell, III, Williamston, MI (US)

(73) Assignee: Board of Trustees operating Michigan State University, East Lansing, MI (US)

( * ) Notice: Under 35 U.S.C. 154(b), the term of this patent shall be extended for 0 days.

(21) Appl. No.: 09/133,017

(22) Filed: Aug. 12, 1998

(51) Int. Cl.[7] ...................... H04M 1/00

(52) U.S. Cl. ...................... 455/63; 342/359; 343/810; 455/562; 455/69

(58) Field of Search ...................... 455/562, 561, 455/25, 193.1, 121, 129, 63, 501, 69; 342/359, 368, 373, 374; 343/810, 812, 813, 814, 897, 876

(56) References Cited

U.S. PATENT DOCUMENTS

| | | | | |
|---|---|---|---|---|
| 3,307,188 | | 2/1967 | Marchetti et al. . | |
| 3,345,585 | | 10/1967 | Hildebrand . | |
| 3,955,201 | * | 5/1976 | Crump | 343/837 |
| 4,707,734 | | 11/1987 | Menich et al. . | |
| 4,728,805 | * | 3/1988 | Dempsey | 342/374 |
| 4,761,822 | | 8/1988 | Maile . | |
| 4,811,032 | | 3/1989 | Boksberger et al. . | |
| 4,933,680 | * | 6/1990 | Shapiro et al. | 343/700 |
| 5,048,116 | | 9/1991 | Schaeffer . | |
| 5,056,153 | | 10/1991 | Taniguchi et al. . | |
| 5,061,944 | * | 10/1991 | Power et al. | 343/795 |
| 5,248,984 | | 9/1993 | Sezai . | |
| 5,355,520 | * | 10/1994 | Freeburg et al. | 455/63 |
| 5,675,343 | | 10/1997 | Champeau . | |
| 5,767,807 | * | 6/1998 | Pritchett | 343/374 |

* cited by examiner

*Primary Examiner*—Edward F. Urban
*Assistant Examiner*—Tilahun Gesesse
(74) *Attorney, Agent, or Firm*—Harness, Dickey & Pierce, P.L.C.

(57) ABSTRACT

A self-structuring antenna system that includes an antenna array defined by a plurality of antenna elements that are selectively electrically connectable to each other by series of switches, so as to alter the physical shape of the antenna array. The antenna elements include antenna wires, where the wires of adjacent antenna elements are connected by a mechanical or solid state switch. One or more feed points are electrically connected to predetermined locations within the antenna array and to a receiver associated with the antenna array. A feedback signal from the receiver provides an indication of signal reception and antenna performance. The feedback signal is applied to a computer that selectively opens and closes the switches. An algorithm is used to program the computer so that the opening and closing of the switches attempts to achieve antenna optimization and performance.

25 Claims, 2 Drawing Sheets

SELF-STRUCTURING ANTENNA SYSTEM WITH A SWITCHABLE ANTENNA ARRAY AND AN OPTIMIZING CONTROLLER

BACKGROUND OF THE INVENTION

1. Field of the Invention

This invention relates generally to a self-structuring antenna and, more particularly, to an antenna system that includes an array of antenna elements selectively electrically connectable to each other to provide different antenna configurations based on signal reception to increase antenna performance for different electrical and/or environmental conditions.

2. Discussion of the Related Art

Communications systems require antennas that detect electromagnetic radiation at certain frequencies to receive a transmitted signal of interest. Thus, antenna systems are specifically designed to provide a suitable performance for a particular communications system and to operate under specific electrical and/or environmental conditions. Typically, the transmission and reception performance of the antenna system is provided by the configuration of the physical antenna structure. An antenna system may be specifically designed to operate within a specific frequency range, to have a particular radiation/reception pattern, and/or to operate in the vicinity of certain conductive structures, such as automobile bodies. The communications system may require that the antenna system be highly directive, cover a wide range of frequencies, and also provide good performance in particular environmental conditions.

The design of an antenna system is generally a compromise to accomplish all of these things. Highly directive antennas typically do not give good reception for wide frequency ranges, wide band frequency antennas must be physically pointed to provide suitable directionality, and the performance of antennas designed to operate well in one environmental condition will typically degrade in performance as the environment changes. For example, consider the set of compromises represented by automobile antennas for a vehicle radio. The automobile antenna must be able to operate over the fairly wide FM radio frequency band, must be sensitive to its placement on a large conducting body, and must be able to maintain a strong received signal as the vehicle changes its orientation to the transmitting antenna. A typical vehicle antenna does not perform any of these requirements well, and is only marginally capable in each. This is because once the vehicle antenna is constructed, it is unable to adapt to the changing situation and environment that the vehicle is exposed to.

There are currently many known wide band antennas, such as log-periodic, discone, spiral, etc. antennas, that are used for various applications and that must be physically moved to respond to a change in orientation. For example, a typical indoor TV antenna must be physically repositioned and electrically retuned when the TV channel is changed due to the change in operation frequency, the change in orientation of the antenna with respect to the transmitter, and the differing interactions between the arriving signals, the antenna, and the TV receiver. Other known antenna systems also require that the antenna be physically moved for different reception criteria.

Phased array antennas, known in the art, offer an improvement over other known antenna designs for providing wide bandwidth reception, good directionality and good performance in changing environments. The known design for phased array antennas does not require the array to be physically repositioned by allowing electrical control of the antenna pattern, for example, to track radar targets. These phased array antennas are, however, extremely complicated and expensive to build due to the need to precisely control the phase of each array element. Because of this, phased array antennas are primarily used by the military. Adaptive antenna arrays use similar design concepts as phased antenna arrays, but have complicated optimization schemes to provide desired antenna patterns in response to changing environmental conditions. Neither the phased array antenna systems nor the adaptive antenna array systems change the physical shape of the antenna structure.

A significant improvement in overall antenna performance could be achieved by an antenna that was capable of altering its physical shape in response to a changing electrical and/or physical environment. These types of antenna systems will be generally referred to here as "self-structuring" antenna systems. An antenna system which physically moves to alter its structure or shape would be, however, impractical to implement.

It is an object of the present invention to provide a self-structuring antenna system that alters its physical shape without actually moving, and is practical to implement, so that the overall antenna performance of the antenna system can be increased over a wide frequency range and in changing physical and/or environmental conditions.

SUMMARY OF THE INVENTION

In accordance with the teachings of the present invention, a self-structuring antenna system is disclosed that includes an antenna array defined by a plurality of antenna elements that are selectively electrically connectable to each other by a series of switches, so as to alter the physical shape of the antenna array. In one embodiment, the antenna elements include cross-wires, where the wires of adjacent antenna elements are connected by a mechanical or solid state switch. Other types of antenna elements can also be used. One or more feed points are electrically connected to predetermined locations within the antenna array and to a receiver associated with the antenna array. A signal on a feedback line from the receiver provides an indication of signal reception and antenna performance, and can be any suitable signal, such as a signal representative of reception strength. The antenna performance signal is applied to a control device, such as a microcomputer, that selectively opens and closes the switches. A suitable algorithm is used to program the control device so that the opening and closing of the switches attempts to achieve antenna optimization and performance.

Alternately, the antenna system can be used to transmit a signal, where the self-structuring of the antenna array provides a desirable directionality, signal strength, etc. for specific applications. In this alternate embodiment, external sensors can be used that receive the transmitted signal, and send a signal to the control device indicative of the signal performance.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a self-structuring antenna system is merely exemplary in nature, and is in no way intended to limit the invention or its applications or uses.

Figure 1:
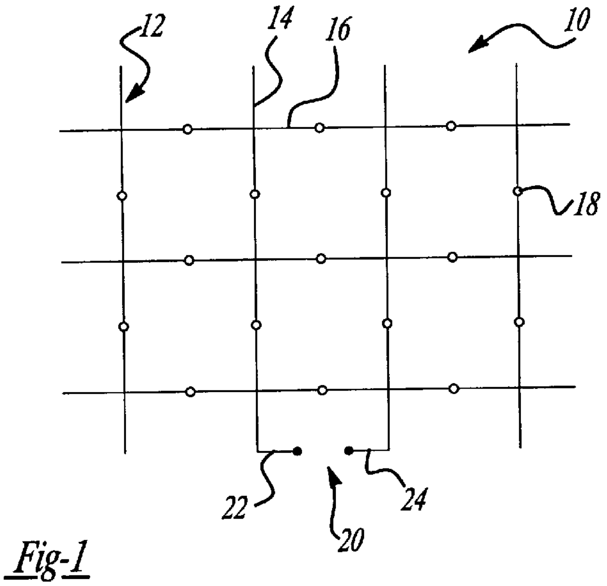
FIG. 1 is a plan view of a cross-wire antenna structure for use in a self-structuring antenna system, according to an embodiment of the present invention.

FIG. 1 shows a plan view of an antenna array 10, according to an embodiment of the present invention. The antenna array 10 includes a series of interconnected antenna elements 12 defining a rectangular array, where each antenna element 12 includes a pair of orthogonal wire elements 14 and 16 formed in a "cross" configuration. In this example, the antenna array 10 includes twelve antenna elements 12 for discussion purposes. However, as will be appreciated by those skilled in the art, the number of antenna elements 12 in the array 10 would depend on the particular design and use for an antenna system that incorporated the antenna array 10. The wire elements 14 and 16 can be made of any suitable conductive material, and have any suitable wire gauge for a certain application.

The array of antenna elements 12 is configured such that each wire element 14 is electrically connected to an adjacent wire element 14, and each wire element 16 is electrically connected to an adjacent wire element 16 by a controllable switch junction 18, except at the outer perimeter of the array 10, as shown. The switch junctions 18 represent any suitable switch device, for example, a mechanical device such as a relay, or an electrical device, such as solid-state relay or solid-state switch. Each switch junction 18 is controllable such that it can be short-circuited (closed) or open-circuited (opened) by a predetermined control signal, for example from an embedded microcomputer, to selectively electrically connect various antenna elements 12 into different configurations. In other words, by electrically short-circuiting certain of the controllable junctions 18 and open-circuiting other junctions 18, the active configuration of the antenna array 10 can be changed accordingly to form different conducting paths within the array 10. This provides the self-structuring feature of the antenna array 10 that allows the array 10 to change its physical shape. By choosing which junctions 18 are closed, a wide variety of different physical antenna shapes can be provided, including loops, dipoles, stubs, etc. Note that the elements 12 need not be physically connected to other elements 12 to affect the performance of the antenna array 10. Each element 12 forms part of the array 10, whether it is actually electrically connected to adjacent elements 12 or not. Thus, parasitic arrays and parasitic tuning stubs are provided, and possible configurations include classic Yagi-Uda arrays.

An antenna feed structure 20, including two feed lines 22 and 24, forms part of the array 10, as shown, to connect the array 10 to receiving circuitry to process the received signal. The feed structure 20 can be attached to the antenna array 10 at any convenient or desirable location in accordance with the design of the antenna system. Multiple feed points are possible, and can be used to control multi-path ghosting and fading. This allows the antenna receiver to distinguish several versions of the same signal arriving from several different directions. The size of the elements 12, and the length of the conductive paths in the array 10 would depend on the particular design of the antenna system, and the frequency band of interest being received. The particular design shown has a specific application for frequencies within the range of 30–500 MHz. As would be appreciated by those skilled in the art, the specific configuration of the array 10 would be based on the particular application.

Control lines used to control the switching of the junctions 18 may be embedded within a skeletal support structure, such as a plastic structure or a simple wire harness. Ordinarily, the interaction of the antenna support structure holding the control lines would be a serious design consideration for an existing antenna structure, but the nature of the self-structuring antenna system of the invention would allow it to automatically compensate for such interactions. However, if these interactions proved to be too severe, a fiber optic cable, or an embedded fiber optic channel, could be used to carry the control signals to opto-electronic switches at the junctions 18.

Figure 2:
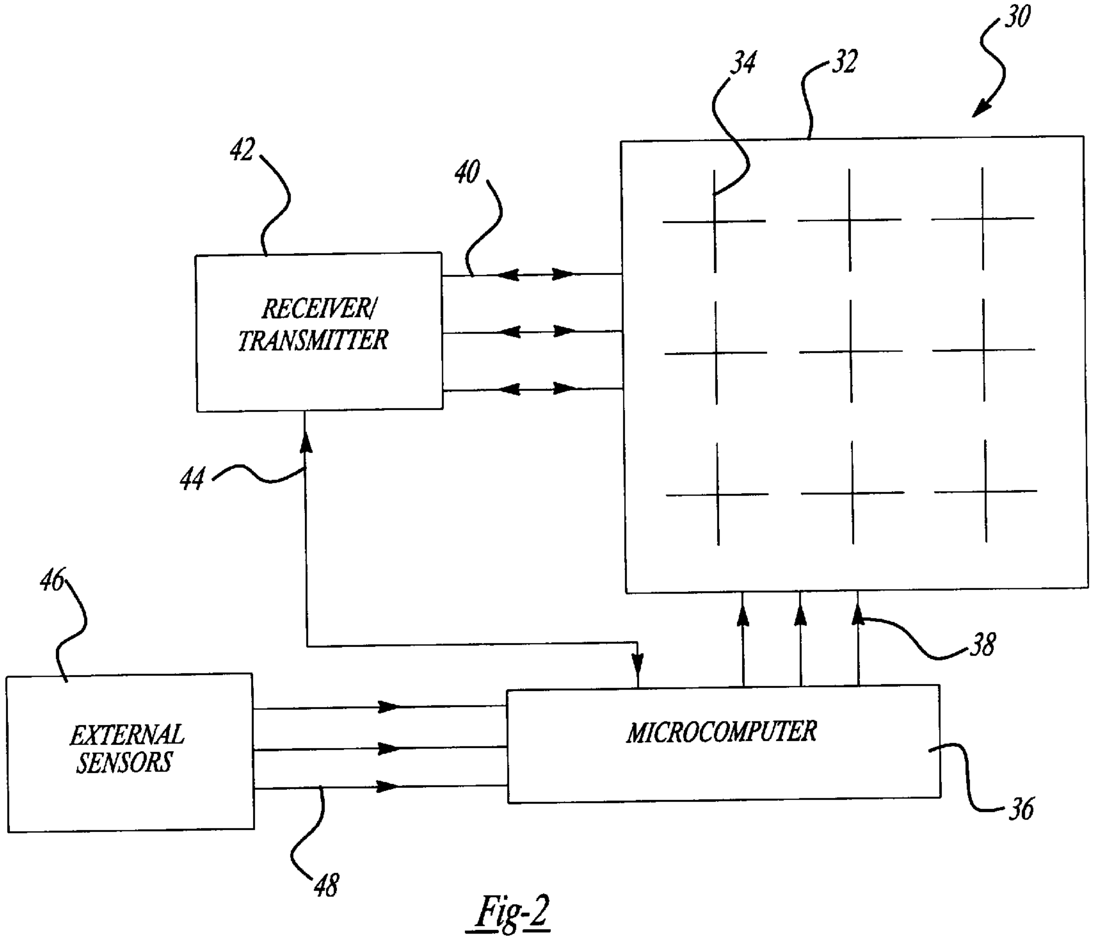
FIG. 2 is a block diagram of a basic self-structuring receiving/transmitting antenna system, according to the invention.

FIG. 2 shows a block diagram of a basic self-structuring receiving/transmitting antenna system 30, according to the invention. The antenna system 30 includes an antenna array 32 of the type described above with reference to FIG. 1. The antenna array 32 includes a plurality of antenna elements 34 including orthogonal cross wire elements, that are selectively electrically connectable in the manner as discussed above. A microcomputer 36 provides electrical control signals on control lines 38 that selectively open and close the switch junctions between the elements 34 in accordance with the performance of the antenna system 10. The microcomputer 36 can be any suitable microcomputer known in the art that provides the necessary control function for the antenna system 30, and is unobtrusive to the antenna design. The microcomputer 36 is programmed with a suitable algorithm to control the switch junctions between the elements 34 in accordance with a particular antenna performance optimization scheme.

The electromagnetic signals received by the antenna array 32 are collected by feed lines 40 connected to the array 32 at a suitable location. Each feed line 40 represents a pair of feed lines connected to a particular location in the array 32 to collect the received signal. The signals on the feed lines 40 are sent to a receiver 42 to process the signals depending on the particular application. The receiver 42 can be any suitable receiver for the purposes described herein, and is selected based on the particular use of the antenna system 30. A performance signal on a feedback control line 44 from the receiver 42 is applied to the microcomputer 36 to provide an indication of the reception performance of the antenna array 32. The performance signal from the receiver 42 can be any signal that represents the reception performance of the antenna array 30, such as a signal strength signal, an audio clarity signal, etc.

The antenna system 30 can also be used as a transmitting system. When used as a transmitting system, the receiver/transmitter 42 generates a signal to be transmitted that is applied to the antenna array 32 on the feed lines 40. As with the discussion of the system 30 being used to receive signals, the physical configuration of the antenna array 32 can be altered to provide the transmitting performance desired, such as directionality. The performance of the transmitting antenna array 32 can be controlled by providing a feedback signal from a plurality of external sensors 46 placed in the near zone field of the antenna array 32 to the microcomputer 36. The sensors 46 can be any suitable sensor known in the art that is responsive to the transmitted signal from the antenna array 32, and that provides an indication of signal strength, direction, etc. of the transmitted signal. The feedback signal indicative of the transmitted signal is sent to the microcomputer 36 on control lines 48.

The success of a self-structuring antenna array of the type described in connection with this invention is highly dependent on the algorithms used to operate the microcomputer 36. A fuzzy control system can be used when several performance qualities are desired, such as high signal strength, good audio clarity, efficient multipath suppression, etc. A trade-off exists between the diversity of the antenna system, the number of possible configurations allowed by the antenna structure, and the complexity of searching for the optimum structural arrangement. An antenna system with a higher level of diversity (more antenna elements and junctions) should provide a more optimal performance, but will require a longer time to find that optimum configuration. For example, the antenna array 10 has three rows of four elements 12, and seventeen junctions 18. This gives $2^{17}$ (131,072) structural arrangements that are possible for the array 10. However, if there are six rows and six columns of elements 12, there are fifty junctions 18, and thus over one trillion possible structures for the array. Obviously, even a fast microcomputer cannot sort through this many possibilities in any practical real-time application. The greatest benefit of the self-structuring skeleton approach is that the optimization is binary, where each junction 18 is either on or off. Many recently developed algorithms can be used to optimize the antenna structure without exhaustively searching all possibilities. Two of the most promising algorithms currently available are genetic algorithms and simulated annealing algorithms.

The self-structuring antenna of the invention offers significant improvements over existing antenna systems because of its inherent versatility. It is not necessary to actually know the best configuration of the antenna array for a particular application. The inherent design and the algorithm used in the microcomputer 36 will determine the best configuration based on the reception. In alternate antenna designs, the antenna elements can be different structures besides cross-wire elements. The antenna arrays of the invention can be comprised of any electrically connectable antenna element design known in the art. The antenna system can be a wide band antenna system because the structure may be altered in response to frequency changes to provide an optimum impedance match. At the same time, the antenna can respond to changes in physical orientation and environmental conditions. For example, it can adapt to the orientation of an automobile as it turns a corner, or the position of a cellular phone as its user moves his body or the way in which he is holding the phone. It can also adapt to the presence of rain, fog or even immersion in water.

Figure 3:
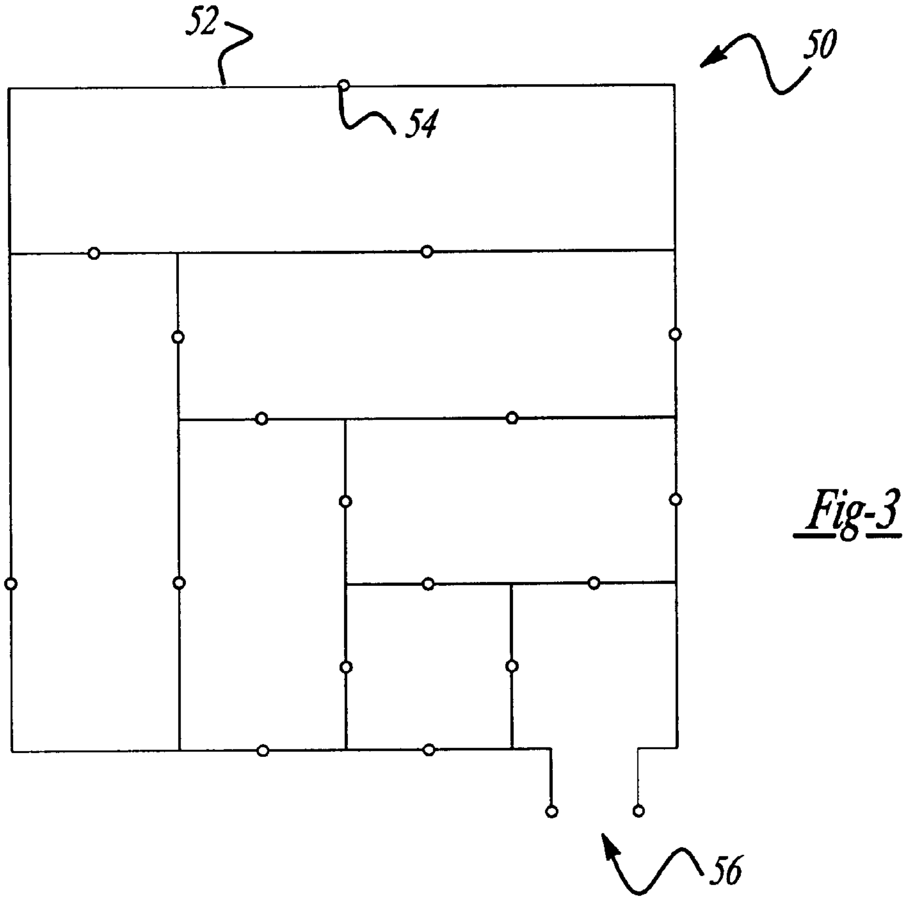
FIG. 3 is a plan view of an antenna structure for use in a self-structuring antenna system, according to another embodiment of the present invention.

The basic structure of the antenna array 10 shown in FIG. 1 has symmetry. Because of this, the different combinations of opened and closed junctions 18 may provide a wide degree of redundancy for the many configurations. This may lead to needless searching for the optimization for a particular reception by the microcomputer 36, and thus a waste of system resources. FIG. 3 shows a plan view of an antenna array 50 including a series of antenna elements 52, here wires, separated by controllable switch junctions 54. As is apparent, the orientation of the junctions 54, and the differing lengths of the various antenna elements 52 provides for different antenna configurations, where the closing of one or more of the junctions 54 does not match the closing of another one or more of the junctions 54. In other words, each configuration of antenna elements based on different closing arrangements of the junctions 54 creates a different antenna configuration. Thus, the closing of one junction 54 provides an electrically conductive path different from the closing of any other junction 54. Further, the differing lengths of the antenna elements 52 provides for a wider range of frequencies. As is apparent, each of the antenna arrays 10 and 50 has the same number of junctions 18 and 54, but the orientation of the junctions 54 provides more diversity.

Figure 4:
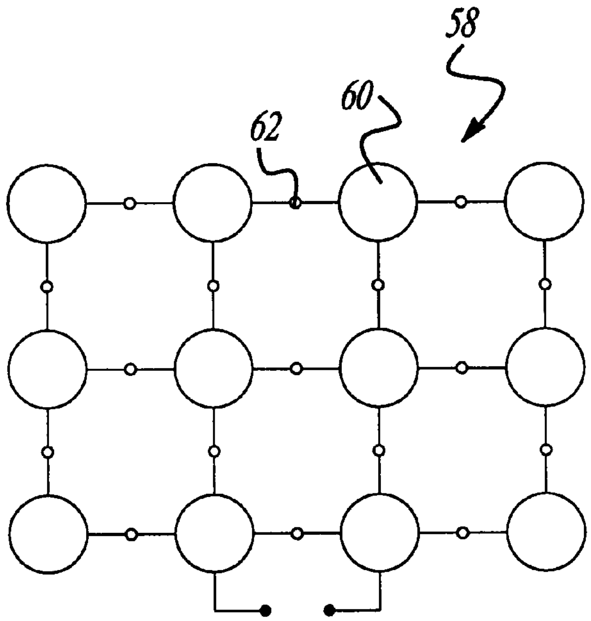
FIG. 4 is a plan view of an antenna structure for use in a self-structuring antenna system, according to another embodiment of the present invention.

As mentioned above, the use of cross-wires as the antenna elements in the antenna array is by way of example in that virtually any type of antenna element can be used within the scope of the invention. To illustrate this, FIG. 4 shows a plan view of an antenna array 58 including a plurality of antenna elements 60 that are conductive disks. The antenna elements 60 are separated by controllable switch junctions 62 to selectively interconnect the antenna elements 60 based on antenna performance in the manner as discussed above. Of course, other antenna element shapes and designs can be used within the scope of the present invention.

The shape of the arrays 10 and 32 above is rectangular. However, other configurations for the arrays 10 and 32 may be better for different applications. A less geometrically-uniform skeletal structure may be useful for embedding antennas within electronic systems and their containers. For example, a skeletal structure could be incorporated into the plastic cabinet of a television set or within the plastic casing of a cellular telephone. The skeletal configuration could take on whatever shape is convenient. Malleable, plastic-based skeletal sheets would provide a flexible technique of applying self-structuring antennas to a wide variety of geometrical conditions.

The simple skeletal antenna structure of the antenna system of the invention has various applications that will improve antennae performance. For example, a simple to use indoor TV antenna is easy to implement through a structure built into the plastic console. A skeletal structure antenna array can be included in each of the console walls and fed to the antenna receiver. When the channel is changed, the structure can be changed to provide both signal strength and picture clarity. To design a fixed antenna to operate within the console would be very difficult, due to the unpredictable interactions with the electrical components inside the TV. However, by its very nature, the self-structuring antenna system of the invention will adapt to provide the best possible design as dictated by the chosen feedback signals. Thus, very little specific design is required.

The skeletal structure of the antenna array of the invention will also offer increased performance for other types of antenna systems. For example, an automobile antenna using the design of the invention would adapt itself to both the presence of the automobile body and the constantly changing orientation of the arriving electromagnetic signal. Additionally, for cellular telephone use, because different users couple to the antenna of the cellular phones differently, and the users are constantly in motion, and users are often in environments subject to multi-path and fading, the self-structuring antenna system of the invention can respond quickly to such a changing environment.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A self-structuring antenna system comprising:

a plurality of antenna elements positioned relative to each other in a predetermined orientation, each of the plurality of antenna elements being selectively electrically connectable to one or more of the other antenna elements;

a plurality of switches electrically connecting the plurality of antenna elements so that closing one of the switches causes at least two antenna elements to be electrically connected, wherein the plurality of switches in combination with the plurality of antenna elements defines an antenna array; and a control device controlling each of the switches, said control device being responsive to a feedback signal that provides communication between the antenna array and the control device, the feedback signal causing the control device to open and close the switches based on a predetermined control scheme, the control scheme optimizing antenna performance based on the feedback signal by continuously switching the switches to change the electrical configuration of the antenna array.

2. The system according to claim 1 wherein the antenna elements include a pair of cross-wires.

3. The system according to claim 2 wherein the plurality of switches includes switches that electrically connect the cross-wires between adjacent antenna elements.

4. The system according to claim 1 wherein the plurality of antenna elements is a plurality of wires, said plurality of wires including wires of differing lengths.

5. The system according to claim 4 wherein the plurality of switches electrically connect adjacent wire elements such that closing of one switch provides an electrically conductive path different from the closing of any other switch.

6. The system according to claim 1 wherein the feedback signal is generated by a receiver connected to the antenna elements, said receiver generating the feedback signal based on a signal received by the antenna system.

7. The system according to claim 6 wherein the feedback signal is indicative of reception performance of the antenna system.

8. The system according to claim 1 wherein the control device is an embedded microcomputer that is run by an antenna algorithm that controls the closing and opening of the plurality of switches.

9. The system according to claim 1 further comprising at least one external sensor, said at least one external sensor outputting a signal to the control device to provide an indication of an external condition.

10. The system according to claim 1 wherein the switches are selected from the group consisting of mechanical relays, solid-state relays and opto-electronic relays.

11. The system according to claim 1 wherein the antenna elements include conductive disks.

12. A self-structuring antenna system for optimizing the reception performance of an antenna, said system comprising:

a plurality of antenna elements defining an antenna array, each of said antenna elements including at least one antenna wire, said antenna array being responsive to an electromagnetic signal;

a plurality of controllable switches electrically connecting the plurality of antenna elements, wherein the switches are selectively electrically closed to electrically connect at least two of the antenna elements in the array;

a receiver electrically connected to the antenna array at least one feed point, said receiver being responsive to the signal from the antenna array and generating a feedback signal based on the electromagnetic signal received by the antenna array; and a control device controlled by an antenna algorithm, said control device being responsive to the feedback signal from the receiver and controlling the plurality of switches by continuously switching the switches to vary the electrical configuration of the antenna array to optimize the performance of the antenna system for a particular application.

13. The system according to claim 12 wherein the antenna elements include a pair of cross-wires, and wherein the plurality of switches electrically connect the cross-wires between adjacent antenna elements.

14. The system according to claim 12 wherein the antenna element wires include wires of differing lengths.

15. The system according to claim 14 wherein the plurality of switches electrically connects adjacent wire elements such that closing of one switch provides an electrically conductive path different from the closing of any other switch.

16. The system according to claim 12 wherein the control device is an embedded computer.

17. The system according to claim 12 wherein the switches are selected from the group consisting of mechanical relays, solid-state relays and opto-electronic relays.

18. A self-structuring antenna system comprising:

a plurality of antenna elements positioned relative to each other and defining an antenna array, each of said antenna elements being selectively electrically connectable to one or more of the other antenna elements;

a plurality of switch means for electrically connecting the plurality of antenna elements so that closing of one of the switch means causes at least two of the antenna elements to be electrically connected; and a control means for controlling each of the switch means, said control means being responsive to a feedback signal that causes the control means to continuously open and close the switch means based on the reception performance of the antenna system so as to optimize the antenna performance based on the feedback signal for a given application.

19. The system according to claim 18 wherein each of the plurality of antenna elements includes a conductive wire.

20. The system according to claim 19 wherein the wires of the antenna elements have differing lengths such that the closing of one switch means provides an electrically conductive path different from the closing of any other switch means.

21. A system according to claim 18 further comprising a receiver means for receiving a signal from the antenna array, said receiver means generating the feedback signal.

22. A method of electrically restructuring an antenna, said method comprising:

providing a plurality of antenna elements that define an antenna array to receive an electromagnetic signal;

providing a plurality of switches electrically connecting the plurality of antenna elements where the closing of one of the switches causes at least two of the antenna elements to be electrically connected to change the electrical configuration of the array;

monitoring the performance of the reception of the electromagnetic signal by the antenna array;

determining an optimized electrical configuration of the antenna array based on the reception of the electromagnetic signal received by the antenna array;

switching the switches to the optimized electrical configuration of the antenna array based on the performance of the antenna array; and continuously responding to changes in the reception performance so as to continuously optimize the performance of the antenna array.

23. The method according to claim 22 wherein providing a plurality of antenna elements includes providing a plurality of antenna elements made of wires, where a plurality of the wires are of different lengths.

24. The method according to claim 23 wherein providing a plurality of antenna elements and providing a plurality of switches is provided so that closing of one switch provides an electrically conductive path different from the closing of any other switch.

25. The method according to claim 22 wherein switching the switches includes using an antenna algorithm that controls a computer to control the switching of the switches.

* * * * *